United States Patent
Kronestedt et al.

(10) Patent No.: US 10,448,304 B2
(45) Date of Patent: Oct. 15, 2019

(54) LOW POWER NODE WHICH PREFERABLY ALLOCATES PCELL ON CARRIER IN FREQUENCY BAND SHARED WITH MACRO NODE

(71) Applicant: Telefonaktiebolaget LM Ericsson (publ), Stockholm (SE)

(72) Inventors: Fredric Kronestedt, Bromma (SE); Magnus Lundevall, Sollentuna (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/074,423

(22) PCT Filed: Feb. 4, 2016

(86) PCT No.: PCT/SE2016/050085
§ 371 (c)(1),
(2) Date: Jul. 31, 2018

(87) PCT Pub. No.: WO2017/135853
PCT Pub. Date: Aug. 10, 2017

(65) Prior Publication Data
US 2019/0037467 A1   Jan. 31, 2019

(51) Int. Cl.
*H04W 36/30* (2009.01)
*H04W 36/08* (2009.01)
*H04W 16/16* (2009.01)

(52) U.S. Cl.
CPC ........... *H04W 36/30* (2013.01); *H04W 36/08* (2013.01); *H04W 16/16* (2013.01); *Y02D 70/1262* (2018.01); *Y02D 70/142* (2018.01)

(58) Field of Classification Search
None
See application file for complete search history.

(56) References Cited

U.S. PATENT DOCUMENTS

2008/0102815 A1* 5/2008 Sengupta ............ H04W 36/24
455/424
2013/0272170 A1* 10/2013 Chatterjee ............ H04W 28/02
370/280
(Continued)

FOREIGN PATENT DOCUMENTS

EP 2525596 A1 11/2012
EP 2538711 A1 12/2012
(Continued)

OTHER PUBLICATIONS

International Search Report and Written Opinion of International Application No. PCT/SE2016/050085, dated Nov. 15, 2016, 20 pages.
(Continued)

*Primary Examiner* — Shripal K Khajuria
(74) *Attorney, Agent, or Firm* — NDWE LLP

(57) ABSTRACT

A low power network node (LPN) and a method performed thereby for providing a primary serving cell to a wireless device associated with the low power network node. The wireless communication network also comprises a neighboring network node, wherein the low power network node and the neighboring network node are configured with a first set of frequency bands B' and the low power network node is configured with a second set of frequency bands B". Since the neighboring network node does not use the second set of frequency bands B", the neighboring network node may not cause interference on carriers of the second set of frequency bands B".

26 Claims, 9 Drawing Sheets

(56) References Cited

U.S. PATENT DOCUMENTS

| | | | | |
|---|---|---|---|---|
| 2014/0051452 | A1* | 2/2014 | Dotzler | H04L 5/0037 |
| | | | | 455/447 |
| 2014/0092771 | A1* | 4/2014 | Siomina | H04W 24/08 |
| | | | | 370/252 |
| 2014/0334320 | A1* | 11/2014 | Liu | H04W 52/242 |
| | | | | 370/252 |
| 2015/0111594 | A1* | 4/2015 | Cui | H04W 28/08 |
| | | | | 455/453 |
| 2015/0237546 | A1* | 8/2015 | Lin | H04W 36/0083 |
| | | | | 455/436 |
| 2015/0327145 | A1* | 11/2015 | Mustapha | H04W 36/30 |
| | | | | 455/437 |
| 2015/0358845 | A1* | 12/2015 | Chapman | H04W 24/08 |
| | | | | 455/67.11 |
| 2016/0073428 | A1* | 3/2016 | Vutukuri | H04W 72/1215 |
| | | | | 370/329 |
| 2016/0135210 | A1* | 5/2016 | Nammi | H04W 72/1231 |
| | | | | 370/329 |

FOREIGN PATENT DOCUMENTS

| | | |
|---|---|---|
| EP | 2675205 A2 | 12/2013 |
| GB | 2494754 A | 3/2013 |
| WO | 2015113226 A1 | 8/2015 |
| WO | 2016204661 A1 | 12/2016 |

OTHER PUBLICATIONS

Jari Salo et al., "Inter-layer Mobility Optimization," 2016, 46 pages, LTE Small Cell Optimization: 3GPP Evolution to Release 13, John Wiley & Sons Ltd.

Meryem Simsek et al., "Cell Selection Modes in LTE Macro-Femtocell Deployment," 2013, 31 pages, Heterogeneous Cellular Networks, First Edition, John Wiley & Sons Ltd.

communication pursuant to Article 94(3) EPC for EP Application No. 16706013.6, dated Aug. 9, 2019, 4 pages.

* cited by examiner

# LOW POWER NODE WHICH PREFERABLY ALLOCATES PCELL ON CARRIER IN FREQUENCY BAND SHARED WITH MACRO NODE

CROSS-REFERENCE TO RELATED APPLICATIONS

This application is a National stage of International Application No. PCT/SE2016/050085, filed Feb. 4, 2016, which is hereby incorporated by reference.

TECHNICAL FIELD

The present disclosure relates to wireless communication and in particular to providing a primary serving cell to a wireless device and camping on a cell.

BACKGROUND

To cope with increasing mobile traffic demands and higher expectations for better user experience, macro network nodes are complemented with low power network nodes, e.g. indoor low power network nodes or indoor systems like Radio Dot System, RDS, and Distributed Antenna system, DAS, since the majority of mobile traffic is generated in indoor locations. The term macro network node generally refers to a "conventional" network node in contrast to low power network nodes, which generally have a significant lower transmission power than the macro network node. However, it shall be pointed out that the low power network node may also be placed outdoor. Enterprise services are moreover being proposed by operators, offering companies and its employees a solution with a range of services and wireless access in their premises. Compared to traditional mobile broadband services, it is expected that enterprise services would target much higher capacity (data demand per user) and user experience targets. For example, enterprise users should get unlimited data when in the office. This is typically not the case for mobile broadband services where user data volumes are limited per month.

Wireless communications use both licensed and unlicensed spectrum. 3$^{rd}$ Generation Partnership Project, 3GPP, technologies typically use licensed spectrum where a single operator uses a part of the licensed spectrum in a country or other area. Unlicensed spectrum is available for e.g. Wi-Fi, and it may be used by several parties and operators in the same area. Sharing rules and techniques are employed in order to avoid uncoordinated interference between the users.

When deploying indoor solutions in an enterprise building, it may be difficult and costly to achieve indoor dominance, i.e. that the indoor system (of low power network nodes) provides stronger signal for wireless devices inside the building than the outdoor network node (generally a macro network node) that is relatively close to the building thereby having a coverage area encompassing at least parts of the building, see FIG. 1. In FIG. 1, a wireless device 110 is illustrated being located relatively close to a wall 105 of the building 100, wherein the low power base station 120 may not be able to establish dominance over the macro network node 130. In the event that many indoor users (wireless devices) are connected to the macro/outdoor network node 130, a capacity imbalance may occur due to the enterprise user demands possible being much higher than the demands for users (wireless devices) 135 outside the building not being offered the unlimited data in enterprise areas.

Indoor dominance is required to connect indoor users to the indoor system when a small cell selection offset is used. A small cell is generally referred to, in this disclosure, as a coverage area of a low power network node. In e.g. Long Term Evolution, LTE, a cell selection offset of up to 9 dB is possible but in many cases the difference between signals of the macro/outdoor network node and low power network node signals may be much larger. The reason is that the macro/outdoor network node generally uses much higher power (e.g. 60-80 W) than the low power network node (<1 W). There can also be line-of-sight propagation from the macro/outdoor network node towards the building or a low building penetration loss that increase this effect. The low power network nodes also use limited power to avoid radiation effects since users (wireless devices) may be very close to the antenna of a low power network node. The lack of indoor dominance may cause the indoor users to be connected to the macro/outdoor network node in these areas. As a result, there will be a negative impact on the macro/outdoor network node's capacity since the enterprise users are expected to demand a high amount of data due to the unlimited data service offerings (normally part of enterprise offerings). This will negatively affect all users connected to the macro network node, i.e. regular mobile broadband service users not connected to the indoor system.

The 3GPP LTE Release-10 specifications have been standardised, supporting Component Carrier, CC, bandwidths up to 20 MHz (which is the maximal 3GPP LTE Release-8 carrier bandwidth). An LTE Rel-10 operation wider than 20 MHz is possible and appear as a number of LTE CCs to an LTE Rel-10 terminal. The straightforward way to obtain bandwidths wider than 20 MHz is by means of Carrier Aggregation, CA. CA implies that a 3GPP LTE Release-10 terminal may receive multiple CC, where the CC have, or at least the possibility to have, the same structure as a 3GPP LTE Release-8 carrier.

CCs are also referred to as cells or serving cells. More specifically, in an LTE network the cells aggregated by a terminal, i.e. wireless device, are denoted primary serving cell, PCell, and secondary serving cells, SCells. The term serving cell comprises both PCell and SCells. All wireless devices have one PCell which is considered "more important", i.e. vital control signalling and other important signalling is typically handled via the PCell. Uplink control signalling is currently always sent on a wireless device's PCell. The component carrier configured as the PCell is the primary CC (i.e. the Primary Component Carrier, PCC) whereas all other component carriers are secondary serving cells. The wireless device may send and receive data both on the PCell and SCells. For control signalling such as scheduling commands this could either be configured to only be transmitted and received on the PCell but where the commands are also valid for SCell, or it can be configured to be transmitted and received on both PCell and SCells. Regardless of the mode of operation, the wireless device may only need to read the broadcast channel in order to acquire system information parameters on the Primary Component Carrier, PCC. System information related to the Secondary Component Carriers, SCC, (i.e. a CC on which the UE has SCells) may be provided to the wireless device in dedicated Radio Resource Control, RRC, messages.

The licensed spectrum is limited and must be used for providing at least primary serving cell to wireless devices. This combined with dominance issues between low power network node(s) and neighbouring network node poses problems for efficiently making use of available resources, licensed and unlicensed. In this disclosure, a neighbouring network node is generally a macro/outdoor network node having higher transmission power than the low power network node.

SUMMARY

The object is to obviate at least some of the problems outlined above. In particular, it is an object to provide a low power network node, a wireless device and respective methods performed thereby. These objects and others may be obtained by providing a low power network node and a wireless device respectively, and a method performed by a low power network node and by a wireless device respectively according to the independent claims attached below.

According to an aspect, a method performed by a low power network node, operable in a wireless communication network, for providing a primary serving cell to a wireless device associated with the low power network node is provided. The wireless communication network also comprises a neighbouring network node, wherein the low power network node and the neighbouring network node are configured with a first set of frequency bands B' and the low power network node is configured with a second set of frequency bands B". The method comprises, when a received signal quality for a carrier in the first set of frequency bands, B', used by the low power network node is equal to or higher than a received signal quality for a carrier in the first set of frequency bands, B', used by the neighbouring network node as measured by the wireless device, allocating the primary serving cell for the wireless device on the carrier in the first set of frequency bands B' used by the low power network node. The method further comprises, when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating the primary serving cell for the wireless device on the carrier in the second set of frequency bands B" used by the low power network node.

According to an aspect, a method performed by a wireless device operable in a wireless communication network for camping on a cell in the wireless communication network when the wireless device is in an idle mode of operation is provided. The wireless communication network comprises a low power network node and a neighbouring network node, wherein the low power network node and the neighbouring network node are configured with a first set of frequency bands B' and the low power network node is configured with a second set of frequency bands B". The method comprises retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The method also comprises performing signal quality measurements on the second set of frequency band B" used by the low power network node, on the first set of frequency bands B' used by the low power network node or on the first set of frequency bands B' used by the neighbouring network node; and selecting cell to camp on based on the retrieved conditional cell reselection rules and the result of the performed signal quality measurements.

According to an aspect, a low power network node, operable in a wireless communication network for providing a primary serving cell to a wireless device associated with the low power network node is provided. The wireless communication network also comprises a neighbouring network node, wherein the low power network node and the neighbouring network node are configured with a first set of frequency bands B' and the low power network node is configured with a second set of frequency bands B". The low power network node is configured to, when a received signal quality for a carrier in the first set of frequency bands, B', used by the low power network node is equal to or higher than a received signal quality for a carrier in the first set of frequency bands, B', used by the neighbouring network node as measured by the wireless device, allocating the primary serving cell for the wireless device on the carrier in the first set of frequency bands B' used by the low power network node. The low power network node is also configured for, when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating the primary serving cell for the wireless device on the carrier in the second set of frequency bands B" used by the low power network node.

According to an aspect, a wireless device operable in a wireless communication network for camping on a cell in a wireless communication network when the wireless device is in an idle mode of operation is provided. The wireless communication network comprises a low power network node and a neighbouring network node, wherein the low power network node and the neighbouring network node are configured with a first set of frequency bands B' and the low power network node is configured with a second set of frequency bands B". The wireless device is configured for retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The wireless device is further configured for performing signal quality measurements on the second set of frequency band B" used by the low power network node, on the first set of frequency bands B' used by the low power network node or on the first set of frequency bands B' used by the neighbouring network node; and for selecting cell to camp on based on the retrieved conditional cell reselection rules and the result of the performed signal quality measurements.

The method performed by the low power network node, the method performed by the wireless device, the low power network node and the wireless device may have a plurality of possible advantages. One possible advantage is that high spectrum efficiency is achieved by maximising the usage of the low power network node resources and at the same time minimising the number of the carriers in B" used by the low power network. Another possible advantage is that the effective coverage area of the unlicensed spectrum provided by the low power network node may be maximised.

BRIEF DESCRIPTION OF DRAWINGS

Embodiments will now be described in more detail in relation to the accompanying drawings, in which.

DETAILED DESCRIPTION

Briefly described, a low power network node and a method performed by the low power network node are provided. The low power network node has at least two sets of frequency bands, a first set of frequency bands, B', and a second set of frequency bands, B", see FIG. 2a. The number of carriers in B' is generally larger than the number of carriers in B". Consequently, the low power node 220a may strive to provide the primary serving cell to the wireless device by means of a carrier in B' since there are generally much more carriers in B' than in B". Since the low power network node 220a may serve a very large amount of wireless devices at the same time, the low power network node 220a may want to reserve the carriers in B" for when they are needed, for example when a wireless device may not be able to properly receive the primary serving cell on carriers in B'. The reason why a wireless device 210a may not be able to properly receive the primary serving cell on carriers in B' may be that a neighbouring network node 230a may also use the same first set of frequency bands B' and the wireless device 210a may experience better received signal quality for carriers in B' used by the neighbouring network node 230a than received signal quality for carriers in B' used by the low power network node 220a, i.e. there is a dominance problem caused by the neighbouring network node 230a.

When there is a dominance problem due to the low power network node 220a and the neighbouring network node 230a using the same set of frequency bands, the wireless device 210a may experience problems receiving transmissions from the low power network node 220a on carriers in that set of frequency bands. One solution may be to hand over the wireless device 210a to the neighbouring network node 230a. However, then the neighbouring network node 230a may become overloaded as it may be serving a large amount of wireless devices 235a. Thus, the low power network node 220a is configured with the second set of frequency bands B" which are not used by the neighbouring network node 230a. Since the neighbouring network node 230a does not use the second set of frequency bands B", the neighbouring network node 230a may not cause interference on carriers of the second set of frequency bands B".

Figure 1:
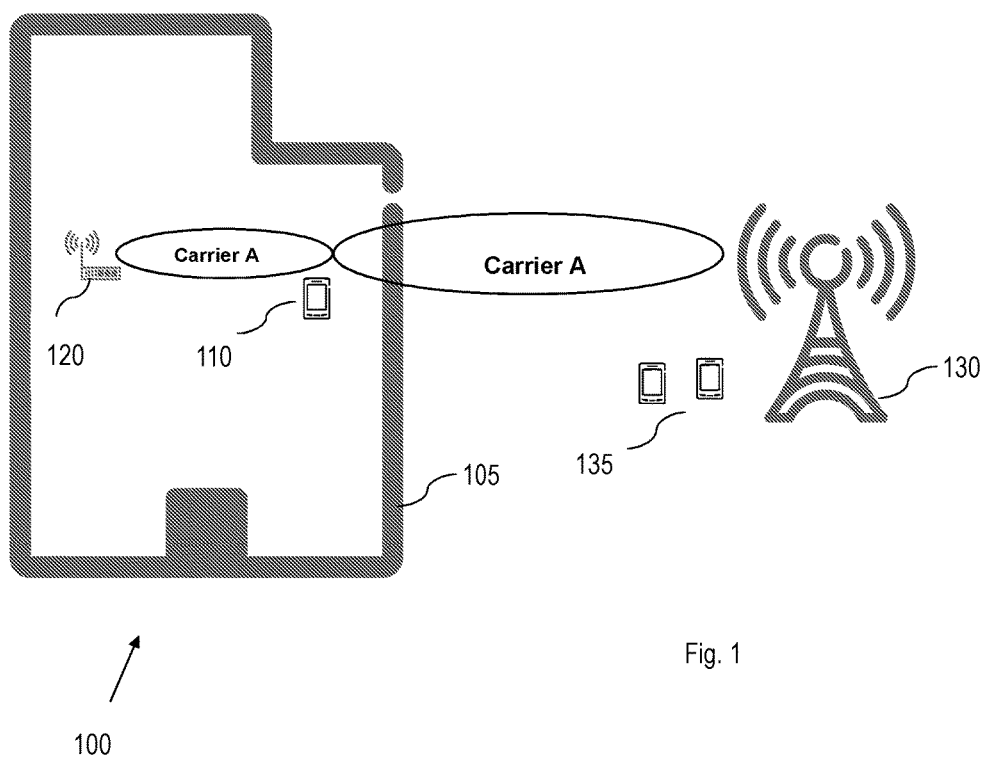
FIG. 1 is an illustration of a dominance problem of a macro network node in an area where it may be desirable that users should be served by the low power network node.
Figure 2A:
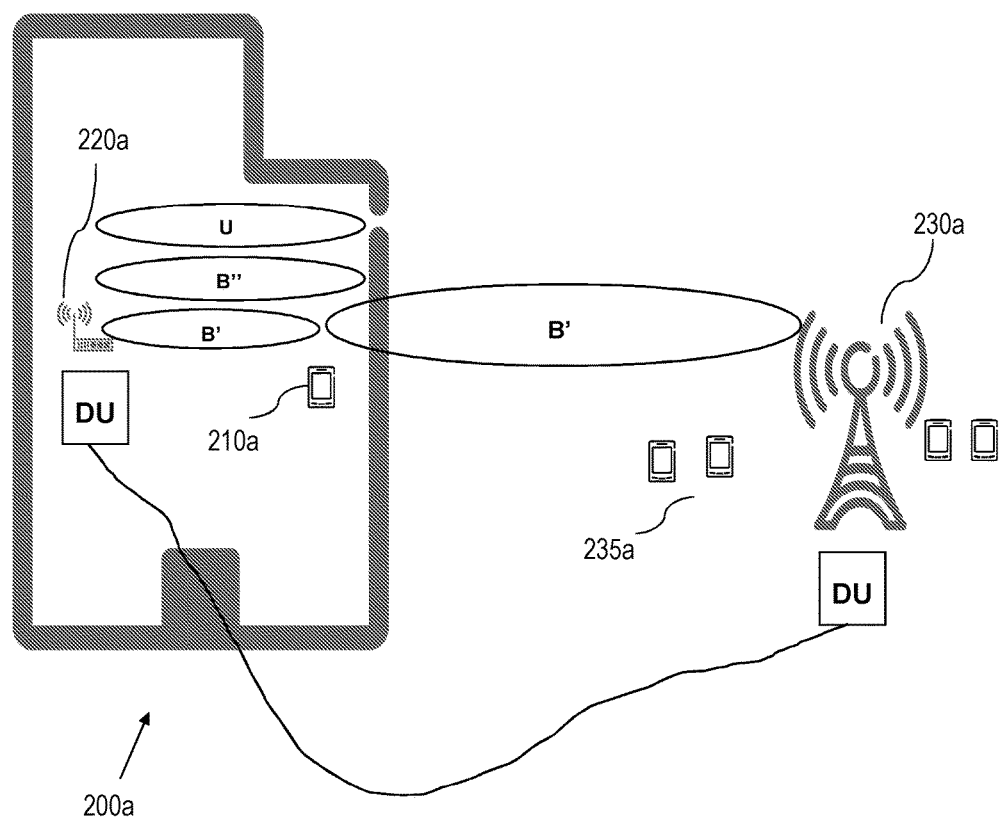
FIG. 2a is an illustration of an example of a low power network node and a neighbouring network node.

However, since the number of carriers in the second set of frequency bands, B", generally is less, or even much less, than the number of carriers in the first set of frequency bands, B', the carriers in B" may relatively soon be all used up. Consequently, the low power network node 220a wants to, at the same time, minimise the use of carriers in B". FIG. 2a also illustrates the low power network node 220a and the neighbouring network node 230a comprising a respective Digital Unit, DU. The DU may comprise hardware and/or software necessary in order for the low power network node 220a and the neighbouring network node 230a to perform different tasks and operations. FIG. 2a also illustrates the low power network node 220a providing resources in an unlicensed frequency band, U. Wireless devices being provided with the primary serving cell on any of the licensed bands B' or B" of the low power network node may also make use of frequencies in the unlicensed band provided by the low power network node 220a. It shall be pointed out that FIG. 2a is merely an illustrative example of general frequency bands which could, as an example be associated with LTE, (i.e. 4G) or any other type of wireless communication system like 2G, 3G and 5G.

Embodiments herein relate to a method performed by a low power network node, operable in a wireless communication network, for providing a primary serving cell to a wireless device associated with the low power network node. The wireless communication network also comprises a neighbouring network node, wherein the low power network node and the neighbouring network node are configured with a first set of frequency bands B' and the low power network node is configured with a second set of frequency bands B".

Figure 2B:
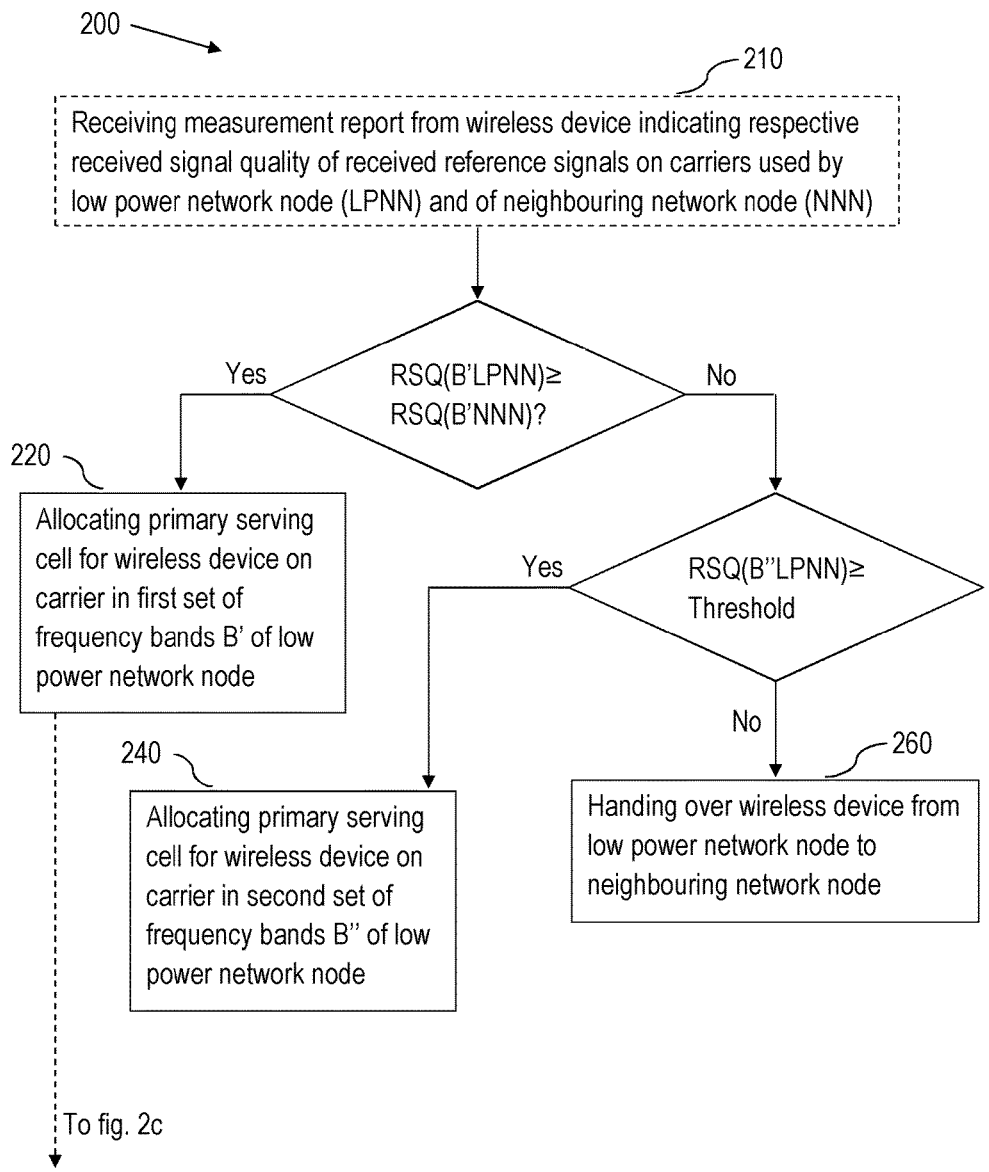
FIG. 2b is a flowchart of a method performed by a low power network node for providing a primary serving cell to a wireless device associated with the low power network node, according to an exemplifying embodiment.

Embodiments of such a method will now be described with reference to FIGS. 2b-2c. FIG. 2b illustrates the method comprising, when a received signal quality for a carrier in the first set of frequency bands, B', used by the low power network node is equal to or higher than a received signal quality for a carrier in the first set of frequency bands, B', used by the neighbouring network node as measured by the wireless device, allocating 220 the primary serving cell for the wireless device on the carrier in the first set of frequency bands B' used by the low power network node.

FIG. 2b illustrates the method further comprising, when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating 240 the primary serving cell for the wireless device on the carrier in the second set of frequency bands B" used by the low power network node.

The wireless device may continuously, regularly, randomly or upon request perform various measurements on signals it receives from network nodes it can "hear". By hearing means that the wireless device receives signals. The wireless device is served by the low power network node, e.g. by being engaged in a service provided by the low power network node. The wireless device generally receives reference signals or pilot signals from at least its serving network node, i.e. the low power network node in this case. The wireless device may also receive reference signals or pilot signals from other network nodes, e.g. the neighbouring network node in this example. In addition, the wireless device may receive data signals from the low power network node.

The wireless device may perform various measurements on these signals, which the wireless device subsequently reports to the low power network node in the form of a measurement report. The measurements may relate to e.g. received signal strength, bit error rate, interference level, path loss etc. In this disclosure, the examples above are examples of received signal quality. Thus received signal quality may be any one of, or any combinations of, these examples and/or other variables suitable for representing signal quality not explicitly mentioned here.

The low power network node may use received measurement report for determining a variety of different things, e.g. which frequencies to use, modulation and coding schemes to employ, whether or not to handover the wireless device etc.

The second set of frequency bands B" is specific for the low power network node and the neighbouring network node is not configured with the second set of frequency bands B". The low power network node thus receives a measurement report from the wireless device. The measurement report indicates at least the received signal quality for a carrier in the first set of frequency bands, B', used by the low power network node and received signal quality for a carrier in the first set of frequency bands, B', used by the neighbouring network node as measured by the wireless device. In case the received signal quality for a carrier in B' used by the low power network node is higher than the received signal quality for a carrier in B' used by neighbouring network node, the wireless device "hears" the low power network node better than the neighbouring network node, at least with respect to the measured carriers. If this is the case, the low power network node allocates 220 the primary serving cell for the wireless device on the carrier in B' used by the low power network node. It may be that other carriers in B' of the neighbouring network node are received at higher received signal quality than other carriers in B' of the low power network node. However, as long as at least one carrier in B' of the low power network node shows a higher received signal quality than at least one carrier in B' of the neighbouring network node, the low power network node may allocate the primary serving cell for the wireless device on that carrier in B' used by the low power network node. In this manner, the low power network node offloads traffic from the neighbouring network node if possible.

Optionally, a margin may be applied such that as long as at least one carrier in B' of the low power network node shows a higher received signal quality than at least one carrier in B' of the neighbouring network node plus the margin, the low power network node may allocate the primary serving cell for the wireless device on that carrier in B' used by the low power network node. The margin is related to the signal quality. Signal quality may be measured or defined in different ways as described above. Consequently, the margin is defined in relation to the way the signal quality is measured or defined.

Alternatively, the low power network node may allocate the primary serving cell for the wireless device on the carrier in B' used by the low power network node in case a minimum number of carriers in B' used by the low power network node exhibits higher received signal quality than a number of carriers in B' used by the neighbouring network node.

If the received measurement report indicates that a received signal quality for a carrier in the second set of frequency bands B" used by the low power network node meets the threshold and the received signal quality for carriers in the first set of frequency bands B' used by the low power network node is lower than the received signal quality for carriers in the first set of frequency bands B' used by the neighbouring network node as measured by the wireless device, the low power network node allocates 240 the primary serving cell for the wireless device on the carrier in the second set of frequency bands B" used by the low power network node.

The threshold may be preconfigured and is defined in the same unit or units as the used signal quality. For example, if the signal quality is measured by received signal strength, then the threshold will related to received signal strength. If the signal quality is measured by bit error rate, then the threshold will be related to bit error rate etc. Generally, if the signal quality meets the threshold, the received signal strength is at least as strong as defined by the threshold, the bit error rate is as low as defined but the threshold, the interference level is as low as defined but the threshold, the path loss is as low as defined but the threshold.

In one example, all carriers in B' used by the neighbouring network node must exhibit a higher received signal quality than all carriers in B' used by the low power network node, together with the received signal quality for the carrier in B" used by the low power network node meeting the threshold, before the low power network node allocates the primary serving cell for the wireless device on the carrier B" used by the low power network node. In this manner, the low power network node minimises the use of carriers in B" used by the low power network node. Generally, the amount or number of carriers in B' exceeds the amount or number of carriers in B" used by the low power network node. Consequently, the low power network node wants to first try to serve the wireless device on any carrier in B'.

In another alternative example, a first number of carriers in B' used by the neighbouring network node must exhibit a higher received signal quality than a second number of carriers in B' used by the low power network node, together with the received signal quality for the carrier in B" used by the low power network node meeting the threshold, before the low power network node allocates the primary serving cell for the wireless device on the carrier B" used by the low power network node.

When the low power network node allocates the primary serving cell for the wireless device on one of the carriers in B' or B" used by the low power network node, the low power network node may then make use of the unlicensed spectrum for one or more secondary serving cells for the wireless device.

The method performed by the low power network node may have several possible advantages. One possible advantage is that high spectrum efficiency is achieved by maximising the usage of the low power network node resources and at the same time minimising the number of the carriers in B" used by the low power network. Another possible advantage is that the effective coverage area of the unlicensed spectrum provided by the low power network node may be maximised.

When the received signal quality for the carrier in the second set of frequency bands B" used by the low power network node does not meet the threshold and the received signal quality for carriers in the first set of frequency bands B' used by the low power network node is lower than the received signal quality for carriers in the first set of frequency bands B' used by the neighbouring network node as measured by the wireless device, the method comprises handing over 260 the wireless device from the low power network node to the neighbouring network node.

Since the number of carriers in B" are lower than the number of carriers in B' used by the low power network node, the low power network node may strive to serve the wireless device by means of allocating the primary serving cell on a carrier in the first set of frequency bands B'. Thus, in order to avoid handing over the wireless device to a carrier in B", i.e. switching allocation of primary serving cell from the carrier in B' to the carrier in B", the low power network node may compare the signal quality as measured by the wireless device of the carrier in B".

Generally and analogously, if the signal quality does not meet the threshold, the received signal strength is not as strong as defined by the threshold, the bit error rate is not as low as defined but the threshold, the interference level is not as low as defined but the threshold, the pathloss is not as low as defined by the threshold.

Consequently, if the received signal quality does not meet the threshold, then the low power network node may not allocate the primary serving cell on a carrier of the B". Thus, when the received signal quality for carriers in the first set of frequency bands B' used by the low power network node is lower than the received signal quality for carriers in the first set of frequency bands B' used by the neighbouring network node as measured by the wireless device, the low power network node may not serve the wireless device and thus hands over the wireless device from the low power network node to the neighbouring network node.

The method may further comprise receiving 210 a measurement report from the wireless device indicating respective received signal quality of received reference signals on carriers used by the low power network node and the neighbouring network node.

As describe above, once the wireless device has performed the various measurements, the wireless device informs the low power network node about the current circumstances by transmitting a measurement report. The low power network node thus receives 210 the measurement report from the wireless device.

The wireless device may receive reference and/or pilot signals from more than the serving network node being the low power network node in this disclosure. The reference and/or pilot signals are transmitted from more or less all network nodes in the wireless communication network and they are transmitted on different carriers. Thus, the low power network node transmits its reference signals on one or more carriers and the neighbouring network node transmits its reference signals on one or more carriers. These respective reference signals on respective carriers are measured by the wireless device and transmitted to the low power network node by means of the measurement report.

Figure 2C:
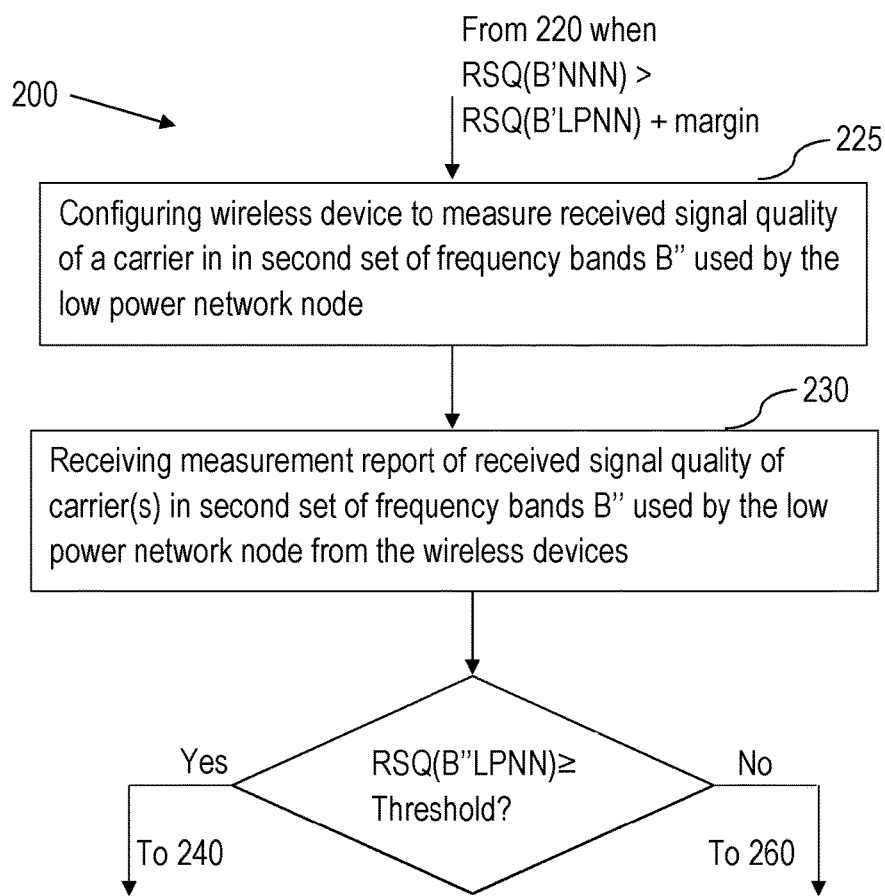
FIG. 2c is a flowchart of a method performed by a low power network node for providing a primary serving cell to a wireless device associated with the low power network node, according to yet exemplifying embodiment.

In an example, illustrated in FIG. 2c, the wireless device is being provided with the primary serving cell on the carrier in the first set of frequency bands B' used by the low power network node, wherein a measurement report is received from the wireless device indicating that the received signal quality for a carrier in the first set of frequency bands B' used by the neighbouring network node is higher than the received signal quality for the carrier in the first set of frequency bands B' used by the low power network node plus a first margin. The method then further comprises configuring 225 the wireless device to measure received signal quality of a carrier in the second set of frequency bands B" used by the low power network node; and receiving 230 a measurement report of received signal quality of the carrier(s) in the second set of frequency bands B" used by the low power network node from the wireless device. The method also comprises allocating 240 the primary serving cell for the wireless device on the carrier in the second set of frequency bands B" used by the low power network node when the received signal quality for the carrier in the second set of frequency bands B" used by the low power network node meets the threshold; and handing over 260 the wireless device from the low power network node to the neighbouring network node when the received signal quality for the carrier in the second set of frequency bands B" used by the low power network node does not meet the threshold.

The low power network node is in this example allocating the primary serving cell for the wireless device on the carrier in the first B' used by the low power network node. The wireless device receives reference signals or pilot signals from the low power network node and the neighbouring network node and performs measurements on the received reference signals. The wireless device then sends the measurement report to the low power network node. In this example, the measurement report informs the low power network node that the received signal quality for the carrier in the first set of frequency bands B' used by the neighbouring network node is higher than the received signal quality for the carrier in the first set of frequency bands B' used by the low power network node plus the first margin. This means that the wireless device "hears" the neighbouring network node better than the low power network node on at least one carrier in the first set of frequency bands B' used by the neighbouring network node.

The low power network node then configures 225 the wireless device to measure received signal quality of the carrier in B" used by the low power network node. This is to find out at least if the wireless device may be served by the low power network node by allocating the primary serving cell for the wireless device on the carrier in B" used by the low power network node. Alternatively, the measurement may also indicate that the wireless device should be handed over to the neighbouring network node. This also means that the wireless device need not perform measurements on carriers in B" unless specifically configured to do so.

The wireless device will perform the measurements and then transmit the measurement report to the low power network node. The low power network node thus receives 230 the measurement report of received signal quality of the carrier(s) in the second set of frequency bands B" used by the low power network node from the wireless device. The measurement may also comprise information of received signal quality of the carrier(s) in B' used by the low power network node and/or received signal quality of the carrier(s) in B' used by the neighbouring network node.

The low power network node may then allocate 240 the primary serving cell for the wireless device on the carrier in the second set of frequency bands B" used by the low power network node when the received signal quality for the carrier in the second set of frequency bands B" used by the low power network node meets the threshold in the same manner as described above.

However, in case the received signal quality for the carrier in the second set of frequency bands B" used by the low power network node does not meet the threshold, the low power network node may hand over 260 the wireless device from the low power network node to the neighbouring network node.

In an example, the wireless device is being provided with the primary serving cell on a carrier in the second set of frequency bands B" used by the low power network node, wherein a received measurement report from the wireless device indicates that the received signal quality for a carrier in the first set of frequency bands B' used by the low power network node is higher than the received signal quality for a carrier in the first set of frequency bands B' used by the neighbouring network node plus a second margin. The method comprises allocating 220 the primary serving cell for the wireless device on the carrier in the first set of frequency bands B' used by the low power network node.

When the low power network node provides the wireless device with the primary serving cell on the carrier in B" used by the low power network node, the low power network node may strive to hand over the wireless device to a carrier in B' used by the low power network node. As stated above, the number of carriers B' are higher than the number of carriers in B". Since the number of carriers in B" may be actually quite few, and thus quite limited, the low power network node may want to strive to serve the wireless device by means of allocating the primary serving cell for the wireless device to a carrier in B' used by the low power network node in order to have available carriers in B" in case they are needed by other wireless devices.

Thus, once the low power network node receives a measurement report from the wireless device indicating that the received signal quality for a carrier in B' used by the low power network node is higher than the received signal quality for a carrier in the B' used by the neighbouring network node plus the second margin, the low power network node allocates the primary serving cell for the wireless device on the carrier in the first set of frequency bands B' used by the low power network node. It may be enough that at least one carrier in B' used by the low power network node exhibits higher signal quality than one, more or all carriers in B' used by the neighbouring network node.

However, not only should the received signal quality for the carrier in B' used by the low power network node be higher than the received signal quality for one, more or all carriers in B' used by the neighbouring network node; the second margin is "added" to the received signal quality for one, more or all carriers in B' used by the neighbouring network node. This increases the probability that the wireless device may stay served by the low power network node by means of allocating the primary serving cell for the wireless device to a carrier in B' used by the low power network node. Due to the margin, the received signal quality of the carrier in B' used by the low power network node may deteriorate a little and still be stronger than the received signal quality of one, more or all carriers in B' used by the neighbouring network node. Consequently, there is no need to hand over the wireless device to any other carrier if the received signal quality of the carrier in B' used by the low power network node deteriorates a little but still is stronger than the received signal quality of one, more or all carriers in B' used by the neighbouring network node. The second margin, as well as any other margin in this disclosure, may be positive, negative, or zero as will be described in more detail below. As described above, the signal quality may be defined or measured in different ways; and depending on the way in which the signal quality is defined or measured, the respective margin herein is defined in a corresponding manner with the signal quality. By setting a margin to zero, the margin does not need to be considered, consequently in this example with the margin being zero, when the received signal quality for a carrier in B' used by the low power network node is higher than the received signal quality for a carrier in the B' used by the neighbouring network node, the low power network node allocates the primary serving cell for the wireless device on the carrier in the first set of frequency bands B' used by the low power network node.

In a further example, when the carrier on which the primary serving cell for the wireless device is being allocated is changed from the carrier in the first set of frequency bands B' used by the low power network node to the carrier in the second set of frequency bands B" used by the low power network node or vice versa, the wireless device is handed over from the carrier in the first set of frequency bands B' to the carrier in the second set of frequency bands B" used by the low power network node or vice versa.

When the radio conditions change, such that the low power network node needs to change carrier on which the primary serving cell is provided to the wireless device, the low power network node performs a handover of the wireless device from a source carrier where the wireless device is currently allocated primary serving cell a target carrier, to which the wireless device is handed over. The source carrier may be in B' used by the low power network node and the target carrier may be in B" used by the low power network node. Alternatively, source carrier may be in B" used by the low power network node and the target carrier may be in B' used by the low power network node.

In other words, the wireless device is handed over between the different sets of frequency bands, B' and B", used by the low power network node. Consequently, the wireless device may remain connected to, or served by, the low power network node and the handover of the wireless device is internal, i.e. inside the low power network node.

At least one of the first and the second margin may be positive, negative or equal to zero.

The different margins may be positive or negative depending on e.g. the way the received signal quality is defined. For example, if the received signal quality is measured by received signal strength, then the threshold will related to received signal strength and the margin may be positive. Merely as a very simplified example, if the threshold is 10 "units" and the margin is 2 "units", then the received signal strength has to be at least 12 "units" to fulfil the criteria meeting the threshold plus the margin.

If the received signal quality is measured by bit error rate, then the threshold will be related to bit error rate and the margin may be negative. Merely as a very simplified example, if the threshold is 10 "units" and the margin is 2 "units", then the bit error rate must not exceed 8 "units" to fulfil the criteria meeting the threshold plus the margin.

The margin may alternatively be zero, which in practice means that the margin is not employed or considered.

In this disclosure, any margin may be positive, negative, or zero. Further, the two or more of the different margins may be equal, i.e. set to the same value, however, all margins may alternatively be different.

Embodiments herein also relate to a method performed by a wireless device operable in a wireless communication network for camping on a cell in the wireless communication network when the wireless device is in an idle mode of operation. The wireless communication network comprises a low power network node and a neighbouring network node, wherein the low power network node and the neighbouring network node are configured with a first set of frequency bands B' and the low power network node is configured with a second set of frequency bands B".

Figure 3:
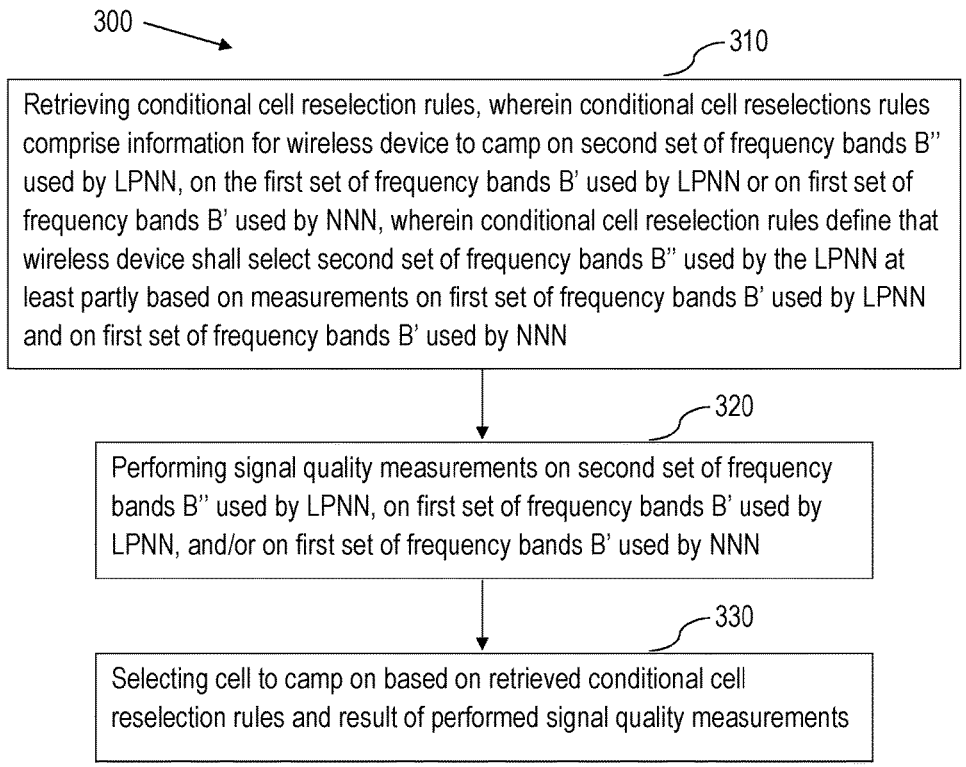
FIG. 3 is a flowchart of a method performed by the wireless device for camping on a cell in the wireless communication network when the wireless device is in an idle mode of operation, according to an exemplifying embodiment.

Embodiments of such a method will now be described with reference to FIG. 3. FIG. 3 illustrates the method comprising retrieving 310 conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The method also comprises performing 320 signal quality measurements on the second set of frequency band B" used by the low power network node, on the first set of frequency bands B' used by the low power network node or on the first set of frequency bands B' used by the neighbouring network node; and selecting 330 cell to camp on based on the retrieved conditional cell reselection rules and the result of the performed signal quality measurements.

The wireless device need to first retrieve the conditional cell reselection rules in order to deduce which cell to camp on among available cells. A cell is generally defined as a coverage area of a network node and a network node generally has at least one coverage area, i.e. at least one cell. In this disclosure, the low power network node has at least two cells, one that is associated with B' used by the low power network node and another one that is associated with B" used by the low power network node. The neighbouring network node has at least one cell associated with B' used by the neighbouring network node. Consequently, the wireless device has at least three options, or cells, to choose from when selecting a cell to camp on. The wireless device is in an idle mode of operation meaning that it is not "connected" to any network node and no primary serving cell is allocated to the wireless device. By camping on a cell, the wireless device "listens" to broadcast and system information in that cell. In this manner, once the wireless device switches operation mode from e.g. idle to active, the wireless device may shorten the time for getting connected to the network node associated with the cell.

Once the wireless device has retrieved the conditional cell reselection rules, the wireless device is informed how to deduce which cell to camp on among available cells. The conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. Consequently, the wireless device performs signal quality measurements on the second set of frequency band B" used by the low power network node, on the first set of frequency bands B' used by the low power network node and/or on the first set of frequency bands B' used by the neighbouring network node.

Once the wireless device has performed the measurements on the available carriers, the wireless device applies the retrieved conditional cell reselection rules to the measurement results and selects cell to camp on based on the retrieved conditional cell reselection rules and the measurement results.

The method performed by the wireless device may have several possible advantages. One possible advantage is that that high spectrum efficiency is achieved by maximising the usage of the low power network node resources and at the same time minimising the number of the carriers in B" used by the low power network. Another possible advantage is that the effective coverage area of the unlicensed spectrum provided by the low power network node may be maximised.

The selecting of cell to camp on may comprise (a) camping on a cell of the second set of frequency bands B" used by the low power network node when the measured signal quality of the first set of frequency bands B' used by the low power network node is lower than the measured signal quality of the first set of frequency bands B' used by the neighbouring network node plus a third margin, and the measured signal quality of the second set of frequency bands B" used by the low power network node meets a threshold, (b) camping on a cell of the first set of frequency bands B' used by the low power network node when the measured signal quality of the first set of frequency bands B' used by the low power network node is higher than the measured signal quality of the first set of frequency bands B' used by the neighbouring network node plus a fourth margin, and (c) camping on a cell of the first set of frequency bands B' used by the neighbouring network node when the measured signal quality of the first set of frequency bands B' used by the low power network node is lower than the measured signal quality of the first set of frequency bands B' used by the neighbouring network node plus a fifth margin and the measured signal quality of the second set of frequency bands B" used by the low power network node does not meet the threshold.

The wireless device has performed the measurement and has obtained a measurement result. Based on the measurement result, the wireless device may compare the received signal quality of different carriers of different cells. Camping on a cell does not necessarily affect the network node the cell belongs to. However, if the wireless device becomes active, it is an advantage if the wireless device is already camping on the cell by means of which it will be served when in active mode.

Consequently, when the measured signal quality of B' used by the low power network node is lower than the measured signal quality of B' used by the neighbouring network node plus the third margin, and the measured signal quality of the second set of frequency bands B" used by the low power network node meets the threshold, the wireless device selects to camp on a cell of B" used by the low power network node. In other words, when the neighbouring network node provides higher measured signal quality plus the third margin with respect to B', then the wireless device may select a cell of B" used by the low power network node to camp on provided that the measured signal quality of B" meets the threshold. In this manner, the wireless device is inclined to select to camp on a cell belonging to the low power network node.

If, however, the measured signal quality of B' used by the low power network node is higher than the measured signal quality of B' used by the neighbouring network node plus the fourth margin, the wireless device may select to camp on the cell of B' used by the low power network node.

Alternatively, the measured signal quality of B' used by the low power network node may be lower than the measured signal quality B' used by the neighbouring network node plus the fifth margin. It may also be that at the same time the measured signal quality of B" used by the low power network node does not meet the threshold. If that is the case, the wireless device may select to camp on a cell of B' used by the neighbouring network node. Consequently, only when the measured signal quality B' used by the neighbouring network node plus the fifth margin is higher than the measured signal quality of B' used by the low power network node and the measured signal quality of B" used by the low power network node does not meet the threshold does the wireless device select to camp on a cell of B' used by the neighbouring network node.

The conditional cell reselection rules can thus be said to define a scheme for the wireless device to prioritise camping on any cell of the low power network node and only camp on a cell of the neighbouring network node in case the radio conditions are such that it would be unfavourable to camp on a cell of the low power network node.

The different margins mentioned above may be positive, negative or zero as described above in relation to the method performed by the low power network node. The margins being positive or negative are related to the definition of signal quality employed by the wireless device and the network nodes. The margins being zero relate to the margins not being employed.

The retrieving 310 of the conditional cell reselection rules may be based on the wireless device reading broadcasted system information from the low power network node and/or from the neighbouring network node.

There are different ways of retrieving the conditional cell reselection rules as will be described and exemplified below. One example is the wireless device reading broadcasted system information from the low power network node and/or from the neighbouring network node.

Network nodes of a wireless communication network generally broadcast various system information, e.g. timing, identifications, settings etc. The system information is to be used by wireless devices in order to select a network node, being able to attach or connect to the network node, understanding and synchronising with the wireless communication network and so on. One part of the broadcasted information may be the conditional cell reselection rules. It may be that different network nodes employ different features and not all network nodes of the wireless communication network employ the conditional cell reselection rules as described in this disclosure. Other network nodes may support other methods and/or rules. Thus the network nodes may broadcast information that are specific to themselves.

The retrieving 310 of the conditional cell reselection rules may also be based on the wireless device receiving the conditional cell reselection rules using dedicated signalling from the low power network node and/or from the neighbouring network node.

This is another example of providing the wireless device with information about the conditional cell reselection rules. Contrary to broadcasting, dedicated signalling takes place between a network node and a wireless device, or any other at least two entities. In this example, at least the low power network node may transmit dedicated signalling to the wireless device informing the wireless device about the conditional cell reselection rules.

Optionally, also the neighbouring network node may transmit dedicated signalling to the wireless device informing the wireless device about the conditional cell reselection rules.

Alternatively, the retrieving 310 of the conditional cell reselection rules may also be based on the wireless device being locally configured with the conditional cell reselection rules.

In this example, the conditional cell reselection rules may be stored in a memory of the wireless device or in any other means coded within the wireless device.

If so, the wireless device may simply retrieve the conditional cell reselection rules from e.g. the memory of the wireless device.

In an example, the method 300 further comprises obtaining values for the threshold and/or any of the third, fourth and the fifth margin comprises receiving the respective values from the low power network node by means of broadcasting or dedicated signalling.

When the wireless device retrieves the conditional cell reselection rules by having them locally configured within the wireless device, the wireless device may further receive the respective values for the threshold and/or any of the third, fourth and the fifth margin comprises receiving the respective values from the low power network node by means of broadcasting or dedicated signalling. It may be the case that the values are part of the conditional cell reselection comprises the values, especially when they are received by broadcast or dedicated signalling. However, in case they are retrieved from a memory or the like of the wireless device, the values for the threshold and the margins may possible not be present in the memory. Then the wireless device needs to obtain those values in order to execute the method. The wireless device may thus receive them from the low power network node, either by broadcast or dedicated signalling.

It shall be pointed out that any of the third, fourth, fifth or any other margin mentioned in this disclosure may be positive, negative or zero as described above.

Figure 4:
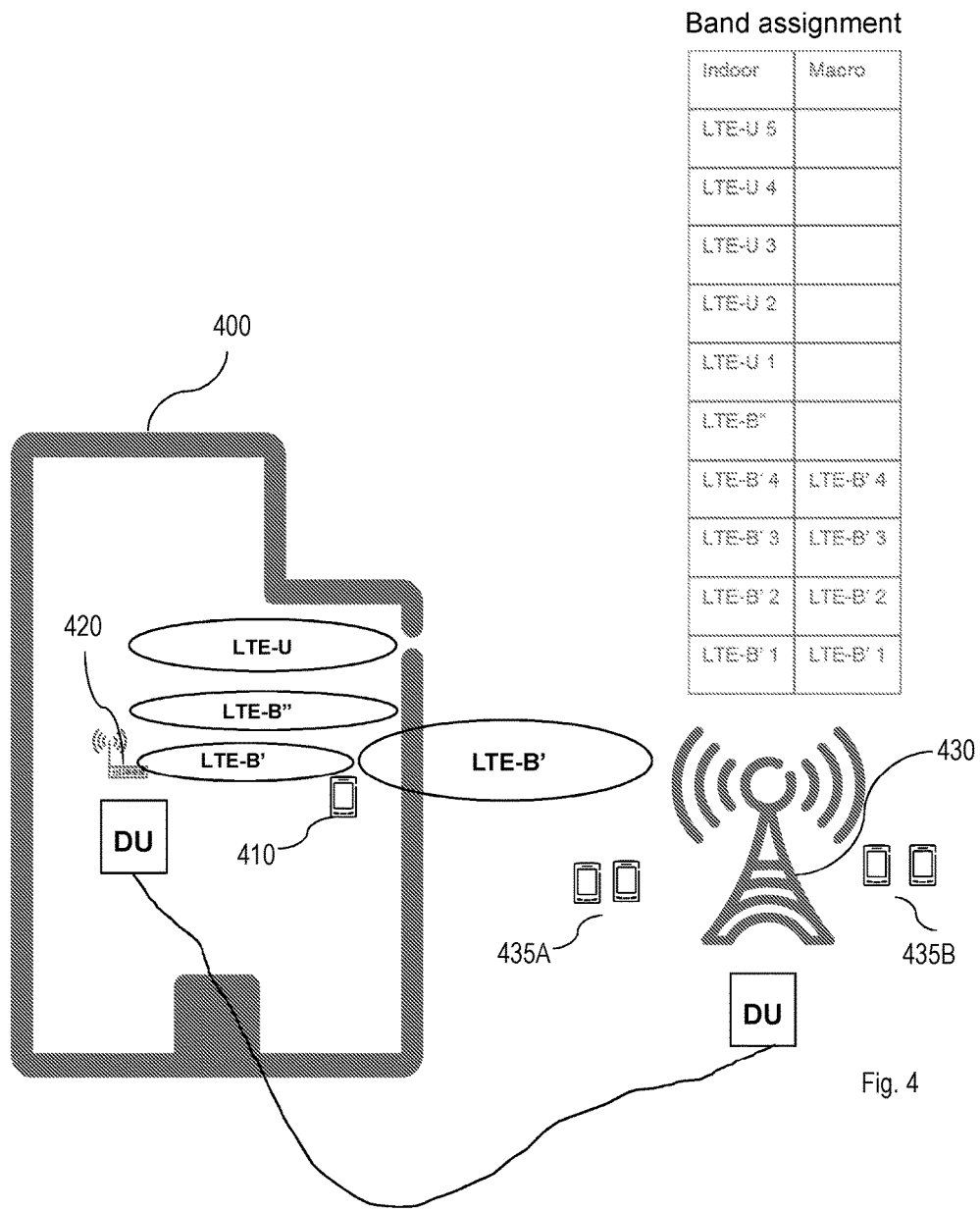
FIG. 4 is an illustration of an example of a solution to the dominance problem.

FIG. 4 is an illustration of an example of a low power network node 420 and a neighbouring network node 430. In FIG. 4, the low power network node 420 and the neighbouring network node 430 are illustrated being configured with a first set of frequency bands B' and the low power network node being configured with a second set of frequency bands B". FIG. 4 is an illustration of an LTE specific example. It shall however be pointed out that the methods described above and the respective low power network node and the neighbouring network node described below are not limited to LTE, being a fourth generation (4G) communication system. The methods described herein and the low power network node and the wireless device respectively may be associated with for example 2G, 3G, and 5G systems, and any combination thereof as well as any type of wireless communication network making use of a combination between usage of licensed frequency bands and unlicensed frequency bands. FIG. 4 also illustrates the low power network node 420 providing resources in an unlicensed frequency band, LTE-U. Wireless devices 410 being provided with the primary serving cell on any of the licensed bands B' or B" of the low power network node may also make use of frequencies in the unlicensed band provided by the low power network node 420.

The use of LTE-B" carrier of the low power network node is minimised and used "only" where the neighbouring network node is dominant over the low power network node (on LTE-B'). The low power network node may strive to allocate primary serving cell on LTE-B' carriers for wireless devices closer to the low power network node, and wireless devices 410 closer to the low power network node may thus strive to use LTE-B' carriers provided by the low power network node as cell to camp on. The primary serving cell selection in the low power network node is based on downlink signal measurements performed by and received from the wireless device served by the low power network node. For handover purposes, the wireless device may be configured to measure and report signal of measurements to the low power network node. The wireless device measures signal quality on a LTE-B' carrier from the neighbouring network node and the low power network node, and then, reports these to the low power network node.

The low power network node allocates primary serving cell for the wireless device in the following way. The primary serving cell is assigned to LTE-B" carrier when the wireless device measures that LTE-B' carrier signal quality from the neighbouring network node is higher than the measurement of LTE-B' carrier from the serving low power network node plus a signal quality margin, the margin may be any of the above describe first to fifth margin. Further, the primary serving cell is assigned to a LTE-B' carrier used by the low power network node when the wireless devices measures that the LTE-B' carrier signal quality from the neighbouring network node is lower than the measurement of the LTE-B' carrier from the serving low power network node plus a signal quality margin being any of the above describe margin.

The decision may be optionally complemented by using measurements on the LTE-B". If this is applied, measurements in the wireless device may be minimised by configuring the wireless device to measure on LTE-B" only when the signal quality of LTE-B' of the serving low power network node is approaching the signal quality of LTE-B' from the neighbouring network node or becomes lower than a predefined limit. Alternatively, measurements in the wireless device may be minimised by configuring the wireless device to measure on LTE-B" only when the signal quality of LTE-B' of neighbouring network node is approaching the signal quality of LTE-B' from the serving low power network node.

Basically two use cases may be defined:
a) The wireless device uses an LTE-B' carrier of the low power network node and is ordered a handover to an LTE-B" carrier if the LTE-B' signal quality of the neighbouring network node is becoming higher than the LTE-B' signal quality of the low power network node by some margin.
b) The wireless device uses primary serving cell on an LTE-B" carrier of the low power network node, monitors LTE-B' (e.g. through inter-frequency measurements) and is ordered a handover to an LTE-B' carrier of the low power network node when the LTE-B' signal quality of the low power network node is better than the LTE-B' signal quality of neighbouring network node by some margin.

The description given above is mainly for the connected mode (i.e. for wireless device in RRC_CONNECTED state in the LTE example). Similar approach may also be used for idle mode selection of the serving cell. In this case the wireless device is provided with new "camping rules" for idle mode (i.e. the wireless device being in RRC_IDLE state in the LTE example). These "camping rules" may be based on similar information as is used on the network side to do the selection of carrier for allocating primary serving cell for the wireless device. One such example is that the wireless device is provided with a new conditional camping rule for LTE-B' and LTE-B". The condition is that LTE-B" carrier is only selected when the wireless device measures that LTE-B' carrier signal quality from the neighbouring network node is higher than the measurement of LTE-B' carrier from the low power network node. Such camping rules enable the move from idle to connected state on the right carrier and cell, and this has the benefit that no handover needs to be instantly triggered after the move from idle to connected state.

Embodiments herein also relate to a low power network node, operable in a wireless communication network for providing a primary serving cell to a wireless device associated with the low power network node. The wireless communication network also comprises a neighbouring network node, wherein the low power network node and the neighbouring network node are configured with a first set of frequency bands B' and the low power network node is configured with a second set of frequency bands B". The low power network node has the same technical features, objects and advantages as the method performed by the low power network node. Hence, the low power network node will only be described in brief in order to avoid unnecessary repetition.

Figure 5:
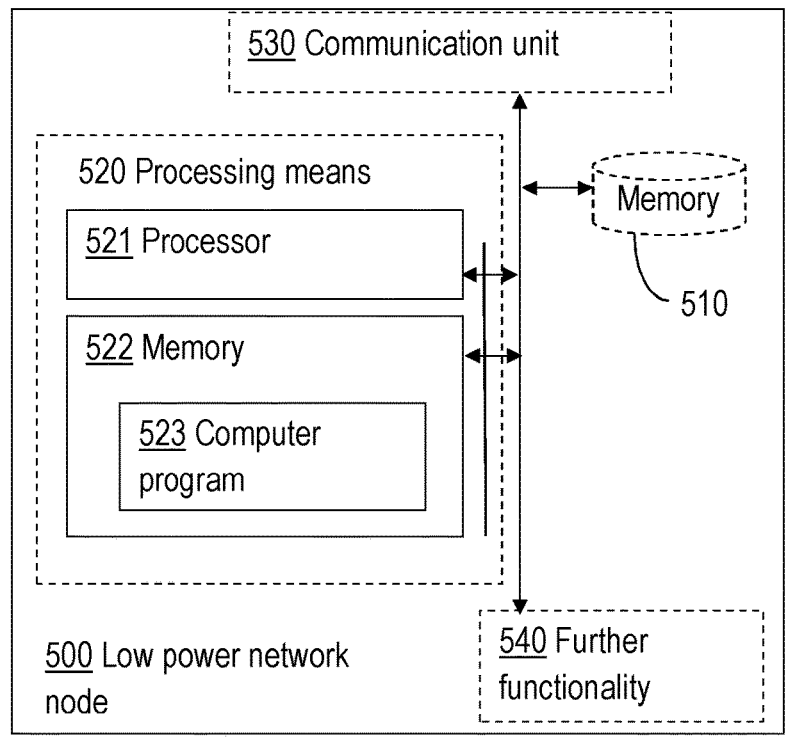
FIG. 5 is a block diagram of a low power network node for providing a primary serving cell to a wireless device associated with the low power network node, according to an exemplifying embodiment.
Figure 6:
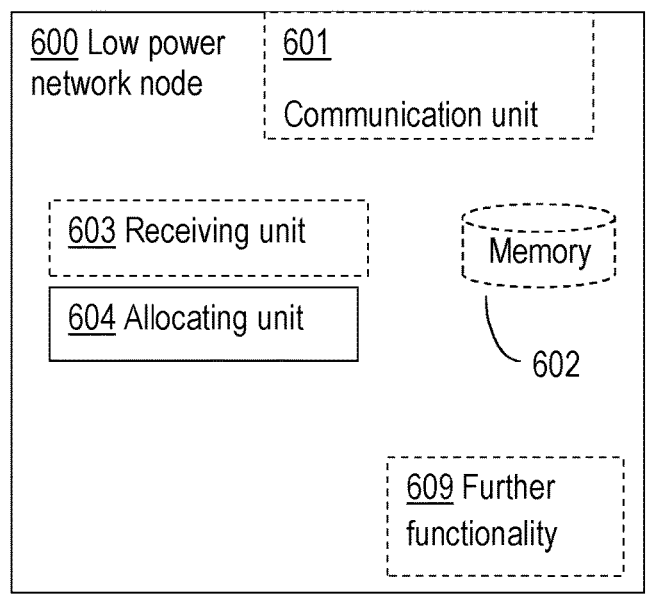
FIG. 6 is a block diagram of a low power network node for providing a primary serving cell to a wireless device associated with the low power network node, according to another exemplifying embodiment.

Embodiments of such a low power network node will now be described with reference to FIGS. 5 and 6. FIGS. 5 and 6 illustrate the low power network node 500, 600 being configured for, when a received signal quality for a carrier in the first set of frequency bands, B', used by the low power network node is equal to or higher than a received signal quality for a carrier in the first set of frequency bands, B', used by the neighbouring network node as measured by the wireless device, allocating the primary serving cell for the wireless device on the carrier in the first set of frequency bands B' used by the low power network node.

The low power network node is also configured for, when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating the primary serving cell for the wireless device on the carrier in the second set of frequency bands B" used by the low power network node.

The low power network node may be realised or implemented in various ways. A first exemplifying realisation or implementation is illustrated in FIG. 5. FIG. 5 illustrates the low power network node 500 comprising a processor 521 and first memory 522, the memory comprising instructions, e.g. by means of a computer program 523, which when executed by the processor 521 causes the low power network node 500 to, when a received signal quality for a carrier in the first set of frequency bands, B', used by the low power network node is equal to or higher than a received signal quality for a carrier in the first set of frequency bands, B', used by the neighbouring network node as measured by the wireless device: allocate the primary serving cell for the wireless device on the carrier in the first set of frequency bands B' used by the low power network node. The memory further comprises instructions, e.g. by means of a computer program 523, which when executed by the processor 521 causes the low power network node 500 to, when a received signal quality for a carrier in the second set of frequency bands B" used by the low power network node meets a threshold (e.g. the threshold described above) and the received signal quality for carriers in the first set of frequency bands B' used by the low power network node is lower than the received signal quality for carriers in the first set of frequency bands B' used by the neighbouring network node as measured by the wireless device, allocate the primary serving cell for the wireless device on the carrier in the second set of frequency bands B" used by the low power network node.

FIG. 5 also illustrates the low power network node 500 comprising a second memory 510. It shall be pointed out that FIG. 5 is merely an exemplifying illustration and second memory 510 may be optional, be a part of the first memory 522 or be a further memory of the low power network node 500. The second memory 510 may for example comprise information relating to the low power network node 500, to statistics of operation of the low power network node 500, just to give a couple of illustrating examples. FIG. 5 further illustrates the low power network node 500 comprising processing means 520, which comprises the first memory 522 and the processor 521. Still further, FIG. 5 illustrates the low power network node comprising a communication unit 530. The communication unit 530 may comprise an interface through which the low power network node 500 communicates with other nodes or entities of or outside the wireless communication network as well as other communication units. FIG. 5 also illustrates the low power network node 500 comprising further functionality 540. The further functionality 540 may comprise hardware and/or software necessary for the low power network node 500 to perform different tasks that are not disclosed herein.

An alternative exemplifying realisation, or implementation, of the low power network node 500, 600 is illustrated in FIG. 6. FIG. 6 illustrates the low power network node 600 comprising an allocating unit 604 for when a received signal quality for a carrier in the first set of frequency bands, B', used by the low power network node is equal to or higher than a received signal quality for a carrier in the first set of frequency bands, B', used by the neighbouring network node as measured by the wireless device, allocating the primary serving cell for the wireless device on the carrier in the first set of frequency bands B' used by the low power network node; and for, when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating the primary serving cell for the wireless device on the carrier in the second set of frequency bands B" used by the low power network node.

In FIG. 6, the low power network node 600 is also illustrated comprising a communication unit 601. Through this unit, the low power network node 600 is adapted to communicate with other nodes and/or entities in or outside the wireless communication network. The communication unit 601 may comprise more than one receiving arrangement. For example, the communication unit 601 may be connected to both a wire and an antenna, by means of which the low power network node 600 is enabled to communicate with other nodes and/or entities in the wireless communication network. Similarly, the communication unit 601 may comprise more than one transmitting arrangement, which in turn is connected to both a wire and an antenna, by means of which the low power network node 600 is enabled to communicate with other nodes and/or entities in the wireless communication network. The low power network node 600 further comprises a memory 602 for storing data. Further, the low power network node 600 may comprise a control or processing unit (not shown) which in turn is connected to the allocating unit 604. FIG. 6 also illustrates the low power network node comprising a receiving unit 603, which may be optional and hence is illustrated as a dotted box. It shall be pointed out that this is merely an illustrative example and the low power network node 600 may comprise more, less or other units or modules which execute the functions of the low power network node 600 in the same manner as the units illustrated in FIG. 6. FIG. 6 also illustrates the low power network node optionally comprising further functionality 609. The further functionality relate to other functionalities of the low power network node which are not related to the method describe herein.

It should be noted that FIG. 6 merely illustrates various functional units in the low power network node 600 in a logical sense. The functions in practice may be implemented using any suitable software and hardware means/circuits etc. Thus, the embodiments are generally not limited to the shown structures of the low power network node 600 and the functional units. Hence, the previously described exemplary embodiments may be realised in many ways. For example, one embodiment includes a computer-readable medium having instructions stored thereon that are executable by the control or processing unit for executing the method steps in the low power network node 600. The instructions executable by the computing system and stored on the computer-readable medium perform the method steps of the low power network node 600 as set forth in the claims.

The low power network node has the same advantages as the method performed by the low power network node. One possible advantage is that high spectrum efficiency is achieved by maximising the usage of the low power network node resources and at the same time minimising the number of the carriers in B" used by the low power network. Another possible advantage is that the effective coverage area of the unlicensed spectrum provided by the low power network node may be maximised.

According to an embodiment, wherein when the received signal quality for the carrier in the second set of frequency bands B" used by the low power network node does not meet the threshold and the received signal quality for carriers in the first set of frequency bands B' used by the low power network node is lower than the received signal quality for carriers in the first set of frequency bands B' used by the neighbouring network node as measured by the wireless device, the low power network node 500, 600 being configured for handing over the wireless device from the low power network node to the neighbouring network node According to yet an embodiment, the low power network node 500, 600 is configured for receiving a measurement report from the wireless device indicating respective received signal quality of received reference signals on carriers used by the low power network node and the neighbouring network node.

According to still an embodiment, wherein the wireless device is being provided with the primary serving cell on the carrier in the first set of frequency bands B' used by the low power network node, wherein a measurement report is received from the wireless device indicating that the received signal quality for a carrier in the first set of frequency bands B' used by the neighbouring network node is higher than the received signal quality for the carrier in the first set of frequency bands B' used by the low power network node plus a first margin. The low power network node 500, 600 is configured for: configuring the wireless device to measure received signal quality of a carrier in the second set of frequency bands B" used by the low power network node; and receiving a measurement report of received signal quality of the carrier(s) in the second set of frequency bands B" used by the low power network node from the wireless device. The low power network node 500, 600 is further configured for: allocating the primary serving cell for the wireless device on the carrier in the second set of frequency bands B" used by the low power network node when the received signal quality for the carrier in the second set of frequency bands B" used by the low power network node meets the threshold; and for handing over the wireless device from the low power network node to the neighbouring network node when the received signal quality for the carrier in the second set of frequency bands B" used by the low power network node does not meet the threshold.

According to another embodiment, wherein the wireless device is being provided with the primary serving cell on a carrier in the second set of frequency bands B" used by the low power network node, wherein a received measurement report from the wireless device indicates that the received signal quality for a carrier in the first set of frequency bands B' used by the low power network node is higher than the received signal quality for a carrier in the first set of frequency bands B' used by the neighbouring network node plus a second margin, the low power network node 500, 600 being configured for allocating the primary serving cell for the wireless device on the carrier in the first set of frequency bands B' used by the low power network node.

According to a further embodiment, wherein when the carrier on which the primary serving cell for the wireless device is being allocated is changed from the carrier in the first set of frequency bands B' used by the low power network node to the carrier in the second set of frequency bands B" used by the low power network node or vice versa, the wireless device is handed over from the carrier in the first set of frequency bands B' to the carrier in the second set of frequency bands B" used by the low power network node or vice versa.

According to yet an embodiment, at least one of the first and the second margin is positive, negative or equal to zero.

Embodiments herein also relate to a wireless device operable in a wireless communication network for camping on a cell in a wireless communication network when the wireless device is in an idle mode of operation, the wireless communication network comprising a low power network node and a neighbouring network node, wherein the low power network node and the neighbouring network node are configured with a first set of frequency bands B' and the low power network node is configured with a second set of frequency bands B". The wireless device has the same technical features, objects and advantages as the method performed by the wireless device. Hence, the wireless device will only be described in brief in order to avoid unnecessary repetition.

Figure 7:
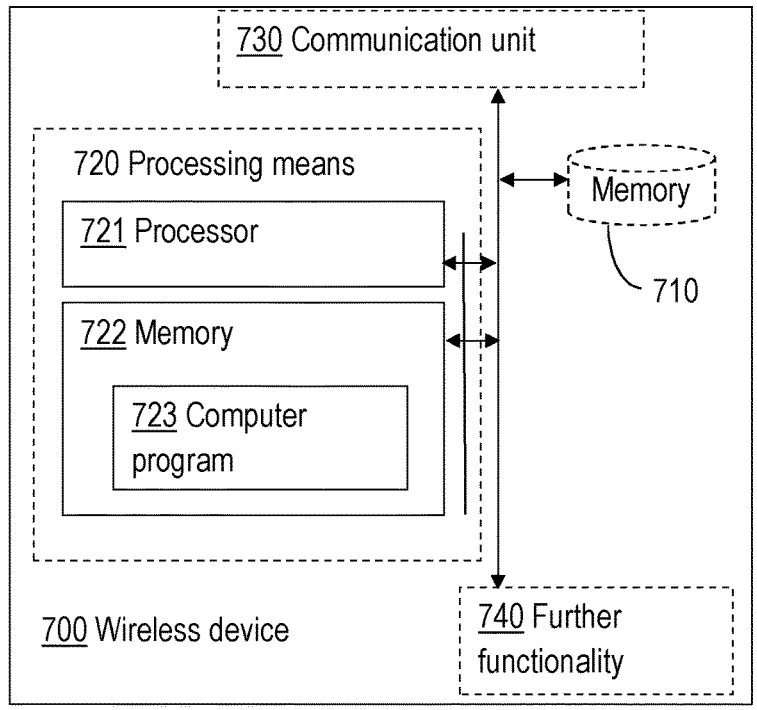
FIG. 7 is a block diagram of a wireless device for camping on a cell in the wireless communication network when the wireless device is in an idle mode of operation, according to an exemplifying embodiment.
Figure 8:
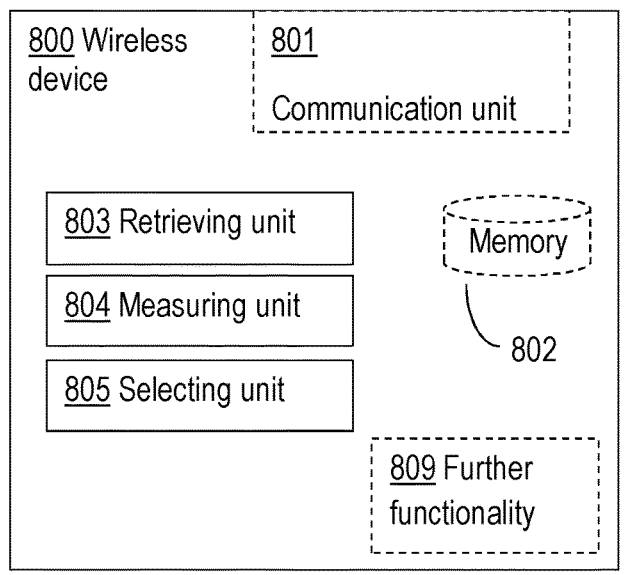
FIG. 8 is a block diagram of a wireless device for camping on a cell in the wireless communication network when the wireless device is in an idle mode of operation, according to another exemplifying embodiment.

Embodiments of such a wireless device will now be described with reference to FIGS. 7 and 8. FIGS. 7 and 8 illustrate the wireless device 700, 800 being configured for retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The wireless device 700, 800 is further configured for performing signal quality measurements on the second set of frequency band B" used by the low power network node, on the first set of frequency bands B' used by the low power network node or on the first set of frequency bands B' used by the neighbouring network node; and for selecting cell to camp on based on the retrieved conditional cell reselection rules and the result of the performed signal quality measurements.

The wireless device 700, 800 may be realised or implemented in various ways. A first exemplifying realisation or implementation is illustrated in FIG. 7. FIG. 7 illustrates the wireless device 700 comprising a processor 721 and a first memory 722, the memory comprising instructions, e.g. by means of a computer program 723, which when executed by the processor 721 causes the wireless device 700 to retrieve conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The memory further comprises instructions, e.g. by means of a computer program 723, which when executed by the processor 721 causes the wireless device 700 to perform signal quality measurements on the second set of frequency band B" used by the low power network node, on the first set of frequency bands B' used by the low power network node or on the first set of frequency bands B' used by the neighbouring network node; and to select cell to camp on based on the retrieved conditional cell reselection rules and the result of the performed signal quality measurement.

FIG. 7 also illustrates the wireless device 700 comprising a second memory 710. It shall be pointed out that FIG. 7 is merely an exemplifying illustration and the second memory 710 may be optional, be a part of the first memory 722 or be a further memory of the wireless device 700. The second memory 710 may for example comprise information relating to the wireless device 700, to statistics of operation of the wireless device 700, just to give a couple of illustrating examples. FIG. 7 further illustrates the wireless device 700 comprising processing means 720, which comprises the memory 722 and the processor 721. Still further, FIG. 7 illustrates the wireless device 700 comprising a communication unit 730. The communication unit 730 may comprise an interface through which the wireless device 700 communicates with other nodes or entities of or outside the wireless communication network as well as other communication units. FIG. 7 also illustrates the wireless device 700 comprising further functionality 740. The further functionality 740 may comprise hardware and/or software necessary for the wireless device 700 to perform different tasks that are not disclosed herein.

An alternative exemplifying realisation, or implementation, of the wireless device 700, 800 is illustrated in FIG. 8. FIG. 8 illustrates the wireless device 800 comprising a retrieving unit 803 for retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. FIG. 8 also illustrates the wireless device 800 comprising a measuring unit 804 for performing signal quality measurements on the second set of frequency band B" used by the low power network node, on the first set of frequency bands B' used by the low power network node or on the first set of frequency bands B' used by the neighbouring network node; and a selecting unit 805 for selecting cell to camp on based on the retrieved conditional cell reselection rules and the result of the performed signal quality measurements.

In FIG. 8, the wireless device 800 is also illustrated comprising a communication unit 801. Through this unit, the wireless device 800 is adapted to communicate with other nodes and/or entities in the wireless communication network. The communication unit 801 may comprise more than one receiving arrangement. For example, the communication unit 801 may be connected to both a wire and an antenna, by means of which the wireless device 800 is enabled to communicate with other nodes and/or entities in the wireless communication network. Similarly, the communication unit 801 may comprise more than one transmitting arrangement, which in turn is connected to both a wire and an antenna, by means of which the wireless device 800 is enabled to communicate with other nodes and/or entities in the wireless communication network. The wireless device 800 further comprises a memory 802 for storing data. Further, the wireless device 800 may comprise a control or processing unit (not shown) which in turn is connected to the different units 803-805. It shall be pointed out that this is merely an illustrative example and the wireless device 800 may comprise more, less or other units or modules which execute the functions of the wireless device 800 in the same manner as the units illustrated in FIG. 8. FIG. 8 also illustrates the wireless device optionally comprising further functionality 809. The further functionality relate to other functionalities of the wireless device which are not related to the method describe herein.

It should be noted that FIG. 8 merely illustrates various functional units in the wireless device 800 in a logical sense. The functions in practice may be implemented using any suitable software and hardware means/circuits etc. Thus, the embodiments are generally not limited to the shown structures of the wireless device 800 and the functional units. Hence, the previously described exemplary embodiments may be realised in many ways. For example, one embodiment includes a computer-readable medium having instructions stored thereon that are executable by the control or processing unit for executing the method steps in wireless device 800. The instructions executable by the computing system and stored on the computer-readable medium perform the method steps of the wireless device 800 as set forth in the claims.

The wireless device has the same possible advantages as the method performed by the wireless device. One possible advantage is that high spectrum efficiency is achieved by maximising the usage of the low power network node resources and at the same time minimising the number of the carriers in B" used by the low power network. Another possible advantage is that the effective coverage area of the unlicensed spectrum provided by the low power network node may be maximised.

According to an embodiment, the selecting of cell to camp on comprises (a) camping on a cell of the second set of frequency bands B" used by the low power network node when the measured signal quality of the first set of frequency bands B' used by the low power network node is lower than the measured signal quality of the first set of frequency bands B' used by the neighbouring network node plus a third margin, and the measured signal quality of the second set of frequency bands B" used by the low power network node meets a threshold, (b) camping on a cell of the first set of frequency bands B' used by the low power network node when the measured signal quality of the first set of frequency bands B' used by the low power network node is higher than the measured signal quality of the first set of frequency bands B' used by the neighbouring network node plus a fourth margin, and (c) camping on a cell of the first set of frequency bands B' used by the neighbouring network node when the measured signal quality of the first set of frequency bands B' used by the low power network node is lower than the measured signal quality of the first set of frequency bands B' used by the neighbouring network node plus a fifth margin and the measured signal quality of the second set of frequency bands B" used by the low power network node does not meet the threshold.

According to yet an embodiment, the retrieving of the conditional cell reselection rules is based on the wireless device reading broadcasted system information from the low power network node and/or from the neighbouring network node.

According to still an embodiment, the retrieving of the conditional cell reselection rules is based on the wireless device receiving the conditional cell reselection rules using dedicated signalling from the low power network node and/or from the neighbouring network node.

According to another embodiment, the retrieving of the conditional cell reselection rules is based on the wireless device being locally configured with the conditional cell reselection rules.

Figure 9:
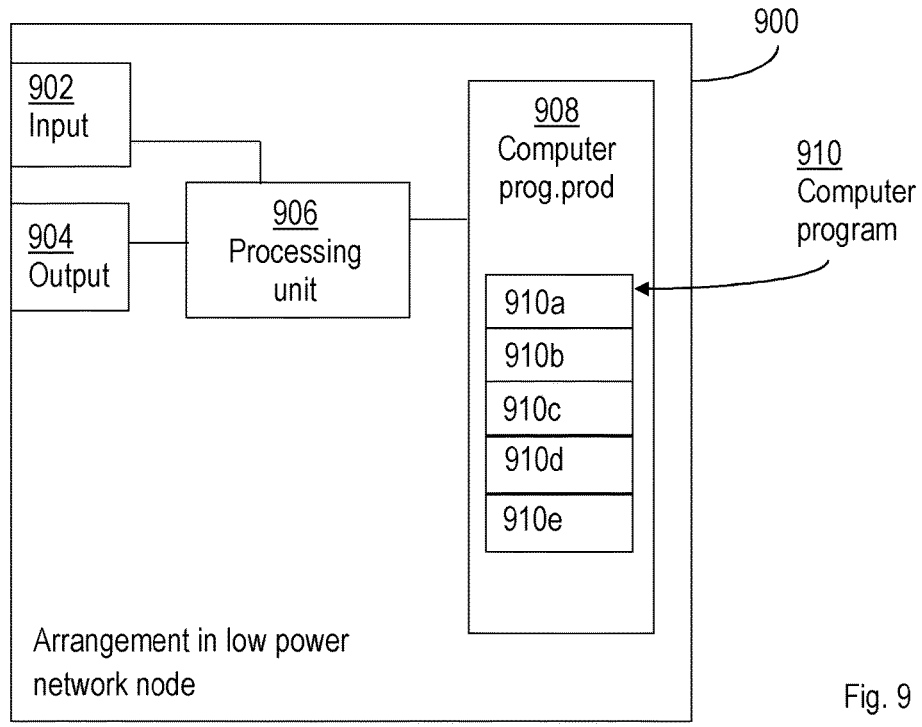
FIG. 9 is a block diagram of an arrangement in a low power network node for providing a primary serving cell to a wireless device associated with the low power network node, according to an exemplifying embodiment.

According to yet an embodiment, the wireless device is further configured for obtaining values for threshold and/or any of the third, fourth and the fifth margin comprises receiving the respective values from the low power network node by means of broadcasting or dedicated signalling FIG. 9 schematically shows an embodiment of an arrangement 900 in a low power network node 600 operable in a wireless communication network for providing a primary serving cell to a wireless device associated with the low power network node. Comprised in the arrangement 900 in the low power network node 600 are here a processing unit 906, e.g. with a Digital Signal Processor, DSP. The processing unit 906 may be a single unit or a plurality of units to perform different actions of procedures described herein. The arrangement 900 of, or in, the low power network node 600 may also comprise an input unit 902 for receiving signals from other entities, and an output unit 904 for providing signal(s) to other entities. The input unit and the output unit may be arranged as an integrated entity or as illustrated in the example of FIG. 6, as one or more interfaces (communication unit) 601.

Furthermore, the arrangement in the low power network node 600 comprises at least one computer program product 908 in the form of a non-volatile memory, e.g. an Electrically Erasable Programmable Read-Only Memory, EEPROM, a flash memory and a hard drive. The computer program product 908 comprises a computer program 910, which comprises code means, which when executed in the processing unit 906 in the arrangement 900 in the low power network node 600 causes the low power network node 600 to perform the actions e.g. of the procedure described earlier in conjunction with FIGS. 2b-2c.

The computer program 910 may be configured as a computer program code structured in computer program modules 910a-910e. Hence, in an exemplifying embodiment, the code means in the computer program of the arrangement 900 in the low power network node comprises an allocating unit, or module, for allocating the primary serving cell for the wireless device on the carrier in the first set of frequency bands B' used by the low power network node when a received signal quality for a carrier in the first set of frequency bands, B', used by the low power network node is equal to or higher than a received signal quality for a carrier in the first set of frequency bands, B', used by the neighbouring network node as measured by the wireless device; and for allocating the primary serving cell for the wireless device on the carrier in the second set of frequency bands B" used by the low power network node when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device.

The computer program modules could essentially perform the actions of the flow illustrated in FIGS. 2b-2c, to emulate the low power network node 600. In other words, when the different computer program modules are executed in the processing unit 906, they may correspond to the allocating unit 604 of FIG. 6.

Figure 10:
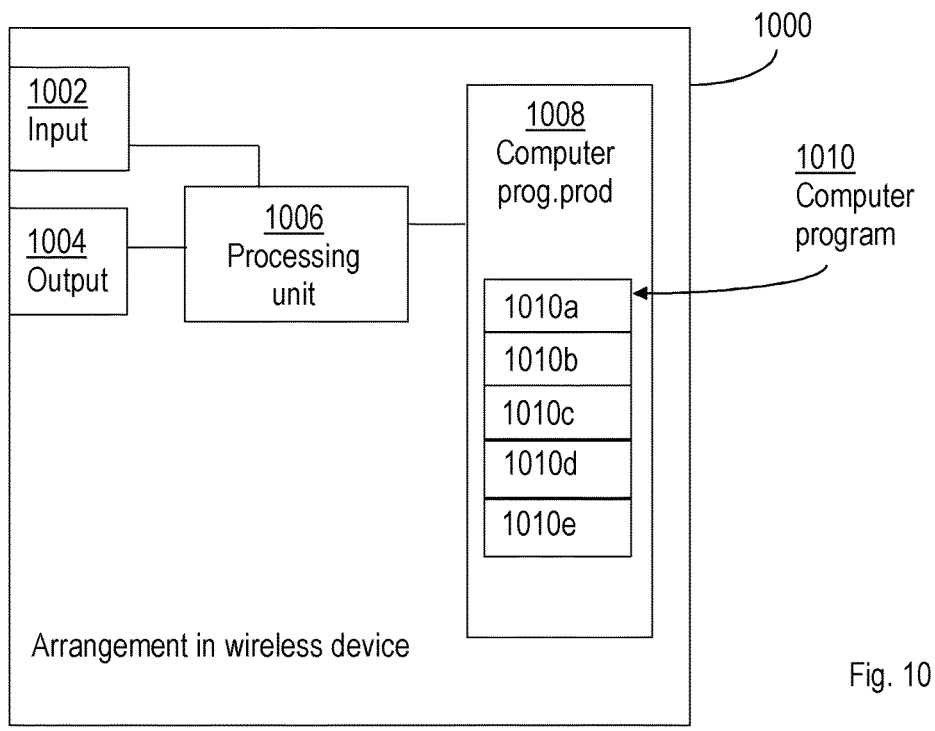
FIG. 10 is a block diagram of an arrangement in a wireless device for camping on a cell in the wireless communication network when the wireless device is in an idle mode of operation, according to an exemplifying embodiment.

FIG. 10 schematically shows an embodiment of an arrangement 1000 in a wireless device 800. Comprised in the arrangement 1000 are here a processing unit 1006, e.g. with a Digital Signal Processor. The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit and the output unit may be arranged as an integrated entity or as illustrated in the example of FIG. 8, as one or more interfaces (communication unit) 801.

Furthermore, the arrangement 1000 in the wireless device 800 comprises at least one computer program product 1008 in the form of a non-volatile memory, e.g. an Electrically Erasable Programmable Read-Only Memory, EEPROM, a flash memory and a hard drive. The computer program product 1008 comprises a computer program 1010, which comprises code means, which when executed in the processing unit 1006 in the arrangement 1000 in the wireless device 800 causes the wireless device 800 to perform the actions e.g. of the procedure described earlier in conjunction with FIG. 3.

The computer program 1010 may be configured as a computer program code structured in computer program modules 1010a-1010e. Hence, in an exemplifying embodiment, the code means in the computer program of the arrangement 1000 in the wireless device 800 comprises a retrieving unit, or module, for retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node. The computer program further comprises a measuring unit, or module, for performing signal quality measurements on the second set of frequency band B" used by the low power network node, on the first set of frequency bands B' used by the low power network node or on the first set of frequency bands B' used by the neighbouring network node; and a selecting unit, or module, for selecting cell to camp on based on the retrieved conditional cell reselection rules and the result of the performed signal quality measurements.

The computer program modules could essentially perform the actions of the flow illustrated in FIG. 3, to emulate the wireless device 800. In other words, when the different computer program modules are executed in the processing unit 1006, they may correspond to the units 803-805 of FIG. 8.

Although the code means in the respective embodiments disclosed above in conjunction with FIGS. 6 and 8 are implemented as computer program modules which when executed in the respective processing unit causes the low power network node and the wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the low power network node and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a low power network node, operable in a wireless communication network, the wireless communication network also comprising a neighbouring network node, wherein the low power network node and the neighbouring network node are configured with a first set of frequency bands B' and the low power network node is configured with a second set of frequency bands B", the method being performed for providing a primary serving cell to a wireless device associated with the low power network node, the method comprising:
  when a received signal quality for a carrier in the first set of frequency bands B' used by the low power network node is equal to or higher than a received signal quality for a carrier in the first set of frequency bands B' used by the neighbouring network node as measured by the wireless device, allocating the primary serving cell for the wireless device on the carrier in the first set of frequency bands B' used by the low power network node, and
  when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocating the primary serving cell for the wireless device on the carrier in the second set of frequency bands B" used by the low power network node.

2. The method according to claim 1, wherein when the received signal quality for the carrier in the second set of frequency bands B" used by the low power network node does not meet the threshold and the received signal quality for carriers in the first set of frequency bands B' used by the low power network node is lower than the received signal quality for carriers in the first set of frequency bands B' used by the neighbouring network node as measured by the wireless device, handing over the wireless device from the low power network node to the neighbouring network node.

3. The method according to claim 1, further comprising receiving a measurement report from the wireless device indicating respective received signal quality of received reference signals on carriers used by the low power network node and the neighbouring network node.

4. The method according to claim 1, wherein the wireless device is being provided with the primary serving cell on the carrier in the first set of frequency bands B' used by the low power network node, wherein a measurement report is received from the wireless device indicating that the received signal quality for a carrier in the first set of frequency bands B' used by the neighbouring network node is higher than the received signal quality for the carrier in the first set of frequency bands B' used by the low power network node plus a first margin, the method further comprising:
  configuring the wireless device to measure received signal quality of a carrier in the second set of frequency bands B" used by the low power network node,
  receiving a measurement report of received signal quality of the carrier in the second set of frequency bands B" used by the low power network node from the wireless device,
  allocating the primary serving cell for the wireless device on the carrier in the second set of frequency bands B" used by the low power network node when the received signal quality for the carrier in the second set of frequency bands B" used by the low power network node meets the threshold, and
  handing over the wireless device from the low power network node to the neighbouring network node when the received signal quality for the carrier in the second set of frequency bands B" used by the low power network node does not meet the threshold.

5. The method according to claim 1, wherein the wireless device is being provided with the primary serving cell on a carrier in the second set of frequency bands B" used by the low power network node, wherein a received measurement report from the wireless device indicates that the received signal quality for a carrier in the first set of frequency bands B' used by the low power network node is higher than the received signal quality for a carrier in the first set of frequency bands B' used by the neighbouring network node plus a second margin, comprises allocating the primary serving cell for the wireless device on the carrier in the first set of frequency bands B' used by the low power network node.

6. The method according to claim 1, wherein when the carrier on which the primary serving cell for the wireless device is being allocated is changed from the carrier in the first set of frequency bands B' used by the low power network node to the carrier in the second set of frequency bands B" used by the low power network node, the wireless device is handed over from the carrier in the first set of frequency bands B' to the carrier in the second set of frequency bands B" used by the low power network node.

7. The method according to claim 5, wherein the second margin is positive, negative or equal to zero.

8. A method performed by a wireless device operable in a wireless communication network comprising a low power network node and a neighbouring network node, wherein the low power network node and the neighbouring network node are configured with a first set of frequency bands B' and the low power network node is configured with a second set of frequency bands B", the method being performed for camping on a cell in the wireless communication network when the wireless device is in an idle mode of operation, the method comprising:

retrieving conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node, performing signal quality measurements on the second set of frequency band B" used by the low power network node, on the first set of frequency bands B' used by the low power network node or on the first set of frequency bands B' used by the neighbouring network node, and selecting a cell to camp on based on the retrieved conditional cell reselection rules and a result of the performed signal quality measurements.

9. The method according to claim 8, wherein the selecting of the cell to camp on comprises:

camping on a cell of the second set of frequency bands B" used by the low power network node when the measured signal quality of the first set of frequency bands B' used by the low power network node is lower than the measured signal quality of the first set of frequency bands B' used by the neighbouring network node plus a third margin, and the measured signal quality of the second set of frequency bands B" used by the low power network node meets a threshold, camping on a cell of the first set of frequency bands B' used by the low power network node when the measured signal quality of the first set of frequency bands B' used by the low power network node is higher than the measured signal quality of the first set of frequency bands B' used by the neighbouring network node plus a fourth margin, and camping on a cell of the first set of frequency bands B' used by the neighbouring network node when the measured signal quality of the first set of frequency bands B' used by the low power network node is lower than the measured signal quality of the first set of frequency bands B' used by the neighbouring network node plus a fifth margin and the measured signal quality of the second set of frequency bands B" used by the low power network node does not meet the threshold.

10. The method according to claim 8, wherein the retrieving of the conditional cell reselection rules is based on the wireless device reading broadcasted system information from at least one of the low power network node and the neighbouring network node.

11. The method according to claim 8, wherein the retrieving of the conditional cell reselection rules is based on the wireless device receiving the conditional cell reselection rules using dedicated signalling from at least one of the low power network node and the neighbouring network node.

12. The method according to claim 9, wherein the retrieving of the conditional cell reselection rules is based on the wireless device being locally configured with the conditional cell reselection rules.

13. The method according to claim 12, further comprising obtaining values for at least one of the threshold, the third margin, the fourth margin and the fifth margin by receiving respective values from the low power network node by means of broadcasting or dedicated signalling.

14. A low power network node, operable in a wireless communication network, the wireless communication network also comprising a neighbouring network node, wherein the low power network node and the neighbouring network node are configured with a first set of frequency bands B' and the low power network node is configured with a second set of frequency bands B", to provide a primary serving cell to a wireless device associated with the low power network node, the low power network node comprising:

a processor; and a memory comprising instructions which, when executed by the processor cause the low power network node to perform operations to:

when a received signal quality for a carrier in the first set of frequency bands B' used by the low power network node is equal to or higher than a received signal quality for a carrier in the first set of frequency bands B' used by the neighbouring network node as measured by the wireless device, allocate the primary serving cell for the wireless device on the carrier in the first set of frequency bands B' used by the low power network node, and when a received signal quality for a carrier in the second set of frequency bands B" used by the low power network node meets a threshold and the received signal quality for carriers in the first set of frequency bands B' used by the low power network node is lower than the received signal quality for carriers in the first set of frequency bands B' used by the neighbouring network node as measured by the wireless device, allocate the primary serving cell for the wireless device on the carrier in the second set of frequency bands B" used by the low power network node.

15. The low power network node according to claim 14, wherein when the received signal quality for the carrier in the second set of frequency bands B" used by the low power network node does not meet the threshold and the received signal quality for carriers in the first set of frequency bands B' used by the low power network node is lower than the received signal quality for carriers in the first set of frequency bands B' used by the neighbouring network node as measured by the wireless device, the low power network node to perform operations to hand over the wireless device from the low power network node to the neighbouring network node.

16. The low power network node according to claim 14, further to perform operations to receive a measurement report from the wireless device indicating respective received signal quality of received reference signals on carriers used by the low power network node and the neighbouring network node.

17. The low power network node according to claim 14, wherein the wireless device is being provided with the primary serving cell on the carrier in the first set of frequency bands B' used by the low power network node, wherein a measurement report is received from the wireless device indicating that the received signal quality for a carrier in the first set of frequency bands B' used by the neighbouring network node is higher than the received signal quality for the carrier in the first set of frequency bands B' used by the low power network node plus a first margin, the low power network node to perform operations to:

configure the wireless device to measure received signal quality of a carrier in the second set of frequency bands B" used by the low power network node, receive a measurement report of received signal quality of the carrier(s) in the second set of frequency bands B" used by the low power network node from the wireless device, allocate the primary serving cell for the wireless device on the carrier in the second set of frequency bands B" used by the low power network node when the received signal quality for the carrier in the second set of frequency bands B" used by the low power network node meets the threshold, and for hand over the wireless device from the low power network node to the neighbouring network node when the received signal quality for the carrier in the second set of frequency bands B" used by the low power network node does not meet the threshold.

18. The low power network node according to claim 14, wherein the wireless device is being provided with the primary serving cell on a carrier in the second set of frequency bands B" used by the low power network node, wherein a received measurement report from the wireless device indicates that the received signal quality for a carrier in the first set of frequency bands B' used by the low power network node is higher than the received signal quality for a carrier in the first set of frequency bands B' used by the neighbouring network node plus a second margin, the low power network node to perform operations to allocate the primary serving cell for the wireless device on the carrier in the first set of frequency bands B' used by the low power network node.

19. The low power network node according to claim 14, wherein when the carrier on which the primary serving cell for the wireless device is being allocated is changed from the carrier in the first set of frequency bands B' used by the low power network node to the carrier in the second set of frequency bands B" used by the low power network node, the wireless device is handed over from the carrier in the first set of frequency bands B' to the carrier in the second set of frequency bands B" used by the low power network node.

20. The low power network node according to claim 18, wherein the second margin is positive, negative or equal to zero.

21. A wireless device operable in a wireless communication network for camping on a cell in a wireless communication network when the wireless device is in an idle mode of operation, the wireless communication network comprising a low power network node and a neighbouring network node, wherein the low power network node and the neighbouring network node are configured with a first set of frequency bands B' and the low power network node is configured with a second set of frequency bands B", the wireless device comprising:

a processor; and a memory comprising instructions which, when executed by the processor cause the wireless device to perform operations to:

retrieve conditional cell reselection rules wherein the conditional cell reselection rules comprise information for the wireless device to camp on the second set of frequency bands B" used by the low power network node, on the first set of frequency bands B' used by the low power network node or on the first set of frequency bands B' used by the neighbouring network node, wherein the conditional cell reselection rules define that the wireless device shall select the second set of frequency bands B" used by the low power network node at least partly based on measurements on the first set of frequency bands B' used by the low power network node and on the first set of frequency bands B' used by the neighbouring network node, perform signal quality measurements on the second set of frequency band B" used by the low power network node, on the first set of frequency bands B' used by the low power network node or on the first set of frequency bands B' used by the neighbouring network node, and select a cell to camp on based on the retrieved conditional cell reselection rules and a result of the performed signal quality measurements.

22. The wireless device according to claim 21, wherein to select the cell to camp on comprises for the wireless device to perform operations to:

camp on a cell of the second set of frequency bands B" used by the low power network node when the measured signal quality of the first set of frequency bands B' used by the low power network node is lower than the measured signal quality of the first set of frequency bands B' used by the neighbouring network node plus a third margin, and the measured signal quality of the second set of frequency bands B" used by the low power network node meets a threshold, camp on a cell of the first set of frequency bands B' used by the low power network node when the measured signal quality of the first set of frequency bands B' used by the low power network node is higher than the measured signal quality of the first set of frequency bands B' used by the neighbouring network node plus a fourth margin, and camp on a cell of the first set of frequency bands B' used by the neighbouring network node when the measured signal quality of the first set of frequency bands B' used by the low power network node is lower than the measured signal quality of the first set of frequency bands B' used by the neighbouring network node plus a fifth margin and the measured signal quality of the second set of frequency bands B" used by the low power network node does not meet the threshold.

23. The wireless device according to claim 21, wherein to retrieve the conditional cell reselection rules is based on the wireless device reading broadcasted system information from at least one of the low power network node and the neighbouring network node.

24. The wireless device according to claim 21, wherein to retrieve the conditional cell reselection rules is based on the wireless device receiving the conditional cell reselection rules using dedicated signalling from at least one of the low power network node and the neighbouring network node.

25. The wireless device according to claim 22, wherein to retrieve the conditional cell reselection rules is based on the wireless device being locally configured with the conditional cell reselection rules.

26. The wireless device according to claim 25, further to perform operations to obtain values for at least one of the threshold, the third margin, the fourth margin and the fifth margin comprises receiving the respective values from the low power network node by means of broadcasting or dedicated signalling.

* * * * *